July 23, 1968  W. H. WILKINSON  3,393,533
ROTATABLE SHAFTING
Filed July 14, 1966

United States Patent Office 3,393,533
Patented July 23, 1968

3,393,533
ROTATABLE SHAFTING
Wilfred Henry Wilkinson, Turnditch, Derby, England, assignor to Rolls-Royce Limited, Derby, England, a British company
Filed July 14, 1966, Ser. No. 565,230
Claims priority, application Great Britain, July 19, 1965, 30,703/65
3 Claims. (Cl. 64—1)

ABSTRACT OF THE DISCLOSURE

A gas turbine engine in which the compressor and turbine shafts are splined together with synthetic resin filler material between the splines.

---

This invention concerns a gas turbine enigne.

It is known to support the compressor and the turbine of a gas turbine engine on rotatable shafting which comprises an outer and an inner shaft which are splined to each other. Such splines, however, need to be very accurately machined so that the production of the shafting is both laborious and expensive. Moreover, gas turbine engines, and indeed all high speed light weight engines under large loads, are very sensitive to out of balance forces, and the machining tolerances with which these splines need to be provided tend to aggravate this sensitvity.

According therefore to the present invention, there is provided a gas turbine engine comprising an outer and an inner shaft which are rotatable in unison, compressor and turbine rotors which are mounted on said shafts, the inner shaft being mounted within the outer shaft, external splines on the inner shaft and internal splines on the outer shaft which are intercalated together, and thermosetting synthetic resin material which is located between said external and internal splines, thermosetting synthetic resin material permitting torque to be transmitted therethrough from one shaft to the other, the inner and outer shafts being provided with holes through which the thermosetting synthetic resin material may respectively be introduced between said external and internal splines and may escape when all the space between said external and internal splines has been filled thereby.

As will be appreciated, in the case of the present invention, it is not essential that the external and internal splines should be accurately machined, since any spaces between them can be taken up by the said thermosetting resin material. Moreover, the use of the said thermosetting synthetic resin material will enable better balance to be achieved.

The thermosetting synthetic resin material may, for example, be a high temperature epoxy or phenolic resin.

The external and internal splines may, if desired, be pretreated to prevent adhesion thereto of the thermosetting synthetic resin material.

The outer and inner shafts preferably have parts which are a push fit in each other.

Figure 1:
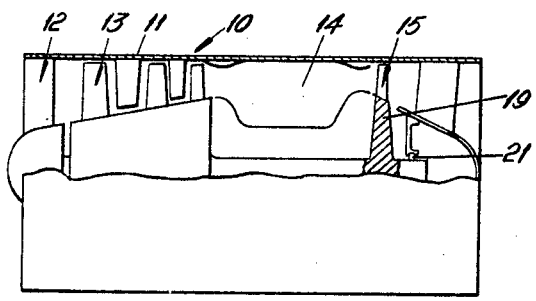
Figure 2:
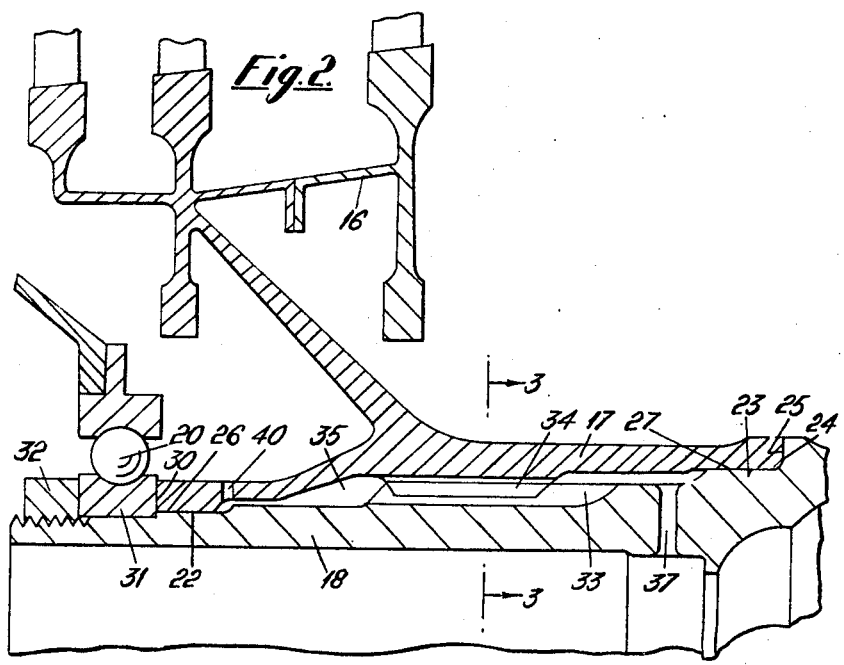
Figure 3:
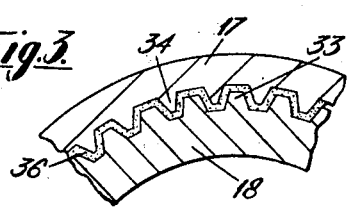

The invention is illustrated, merely by way of example, in the accompanying drawings, in which:

FIGURE 1 is a diagrammatic view, partly in section, of a gas turbine engine provided with rotatable shafting according to the present invention, FIGURE 2 is a broken-away sectional view showing part of the structure of FIGURE 1 on a larger scale, and FIGURE 3 is a broken-away section taken on the line 3—3 of FIGURE 2.

Referring to the drawings, a gas turbine engine 10 has an engine casing 11 within which there are mounted in flow series an air intake 12, a compressor 13, combustion equipment 14 and a turbine 15.

The compressor 13 has a rotor 16 which is carried by a rotatable shaft 17 (FIGURE 2). Mounted concentrically within the shaft 17, and rotatable in unison therewith, is a shaft 18 which carries a rotor 19 of the turbine 15. The shaft 18 is mounted within a front bearing 20 and within a rear bearing 21 both of which are supported from the engine casing 11.

The shaft 18 is provided with two accurately machined spigot portions 22, 23, and with an accurately machined shoulder 24. The shaft 17 is provided with an accurately machined end face 25, which is located against the shoulder 24, and with accurately machined spigot portions 26, 27 which are a push fit over the spigot portions 22, 23 respectively.

The shaft 17 has an end portion 30 at its upstream end which is located in contact with an inner race 31 of the bearing 20, the inner 31 being axially located by means of a nut 32 which is threaded onto the shaft 18.

The shaft 18 is provided with roughly machined external splines 33 which are intercalated with roughly machined internal splines 34 of the shaft 17, the splines 33, 34 being disposed in an annular space 35 between the shafts 17, 18.

The space 35 is filled with a filler material 36 which permits the necessary torque to be transmitted therethrough from the shaft 18 to the shaft 17 via the splines 33, 34. The filler material 36 is preferably a high temperature epoxy or phenolic synthetic resin material.

The shaft 18 is provided with at least one hole 37 through which the filler material 36 may be pumped or otherwise introduced into the space 35 so as to fill the gap between the internal and external splines 33, 34. The shaft 17 is, moreover, provided with at least one hole 40 through which the filter material 36 may escape when all the space 35 has been filled thereby, whereby to provide an indication as to when the filling of the space 35 is complete.

If an epoxy or phenolic resin is used as the filler material 36, it is introduced into the space 35 in an uncured or partly cured state, curing of the resin in the space 35 being thereafter effected.

If desired, the splines 33, 34 may be pre-treated (by means not shown) so as to prevent adhesion thereto of filler material 36. The filler material 36 may also be such as to be capable of being sheared when it is desired to disassemble the shafts 17, 18.

The engine 10 may, if desired, be a vertical lift jet engine, i.e. an engine adapted to produce vertical lift forces on an aircraft independently of those generated aerodynamically by forward flight of the aircraft. For this purpose, it may be provided with a high thrust to weight ratio, e.g. of at least 8:1 and preferably of at least 16:1.

As will be appreciated, the construction shown in the drawings is much simpler and less expensive to produce than would be the alternative of forming the splines 33, 34 by accurate machining so that the provision of the filler material 36 was not necessary. Moreover, the use of the filler material 36 makes the engine less sensitive to out of balance forces than it would be if manufacturing tolerances had to be given to the splines 33, 34.

I claim:

1. A gas turbine engine comprising an outer and an inner shaft which are rotatable in unison, compressor and turbine rotors which are mounted on said shafts, the inner shaft being mounted within the outer shaft, external splines on the inner shaft and internal splines on the outer shaft which are intercalated together, and thermosetting synthetic resin material which is located between said external and internal splines, said thermosetting synthetic resin material permitting torque to be transmitted therethrough from one shaft to the other, the inner and outer shafts being provided with holes through which the thermosetting synthetic resin material may respectively be introduced between said external and internal splines, and may escape when all the space between said external and internal splines has been filled thereby.

2. Rotatable shafting as claimed in claim 1 in which the external and internal splines are formed to prevent adhesion thereto of the thermosetting synthetic resin material.

3. Rotatable shafting as claimed in claim 1 in which the outer and inner shafts have parts which are a push fit in each other.

References Cited

UNITED STATES PATENTS

| | | | |
|---|---|---|---|
| 2,121,819 | 6/1938 | Oles | 64—27 |
| 2,696,346 | 12/1954 | Marchant et al. | 64—9 XR |
| 2,739,462 | 3/1956 | Wincenciak | 64—27 |
| 2,785,550 | 3/1957 | Petrie | 64—9 |
| 3,101,961 | 8/1963 | White | 287—53 XR |

FOREIGN PATENTS

| | | |
|---|---|---|
| 1,265,193 | 5/1961 | France. |
| 552,408 | 4/1943 | Great Britain. |

HALL C. COE, *Primary Examiner*.